United States Patent [19] [11] 3,949,627
Murakami [45] Apr. 13, 1976

[54] FLUID PRESSURE CONTROL SYSTEM FOR AUTOMATIC FLUID TRANSMISSIONS

[75] Inventor: Noboru Murakami, Nagoya, Japan
[73] Assignee: Aisin Seiki Kabushiki Kaisha, Japan
[22] Filed: Apr. 25, 1974
[21] Appl. No.: 464,159

[30] Foreign Application Priority Data
 Apr. 25, 1973 Japan.............. 48-47391
 May 10, 1973 Japan.............. 48-52277

[52] U.S. Cl................ 74/867; 74/869
[51] Int. Cl.²................ B60K 21/12
[58] Field of Search........ 74/867, 868, 869

[56] References Cited
UNITED STATES PATENTS

| | | | |
|---|---|---|---|
| 3,561,295 | 2/1971 | Iijima | 74/869 |
| 3,621,737 | 11/1971 | Uozumi | 74/868 |
| 3,683,721 | 8/1972 | Uozumi et al. | 74/869 |
| 3,703,110 | 11/1972 | Uozumi et al. | 74/868 |
| 3,707,890 | 1/1973 | Ito | 74/868 |
| 3,707,891 | 1/1973 | Asano et al. | 74/869 |
| 3,752,015 | 8/1973 | Murakami | 74/869 |
| 3,822,611 | 7/1974 | Piret | 74/869 X |

Primary Examiner—Benjamin W. Wyche
Assistant Examiner—Lance W. Chandler
Attorney, Agent, or Firm—Oblon, Fisher, Spivak, McClelland & Maier

[57] ABSTRACT

A fluid pressure control system for automatic fluid transmissions includes a fluid pressure source, a fluid pressure regulating valve for regulating the fluid from the source to a particular line pressure, and a plurality of frictional engaging devices, adapted to be actuated by the line pressure through means of a manual shift valve, for attaining a particular gear ratio within the gear train of the transmission which are interposed between the input and output shafts. A governor valve generates a governor pressure in response to the rotational speed of the input shaft, a throttle valve generates a throttle pressure in response to the engine throttle valve, and a shift valve selectively actuates the frictional engaging devices in response to the governor and throttle pressures.

7 Claims, 4 Drawing Figures

FLUID PRESSURE CONTROL SYSTEM FOR AUTOMATIC FLUID TRANSMISSIONS

BACKGROUND OF THE INVENTION

Field of the Invention

The present invention relates generally to an automatic fluid transmission and more particularly to a fluid pressure control system for automatic fluid transmissions.

SUMMARY OF THE INVENTION

It is an object of the present invention to provide an improved fluid pressure control system for controlling the flow of pressurized fluid to the clutch or brake assemblies of the vehicle.

Another object of the present invention is to provide an improved fluid pressure control system which is capable of precisely controlling the fluid pressure in order to maximize the functions of the transmission.

Still another object of the present invention is to provide an improved fluid pressure control system which is capable of responding to all existing conditions present over a wide range of operation.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts throughout the several views, and wherein.

DETAILED DESCRIPTION OF THE PREFERRED EMBODIMENTS

Figure 1:
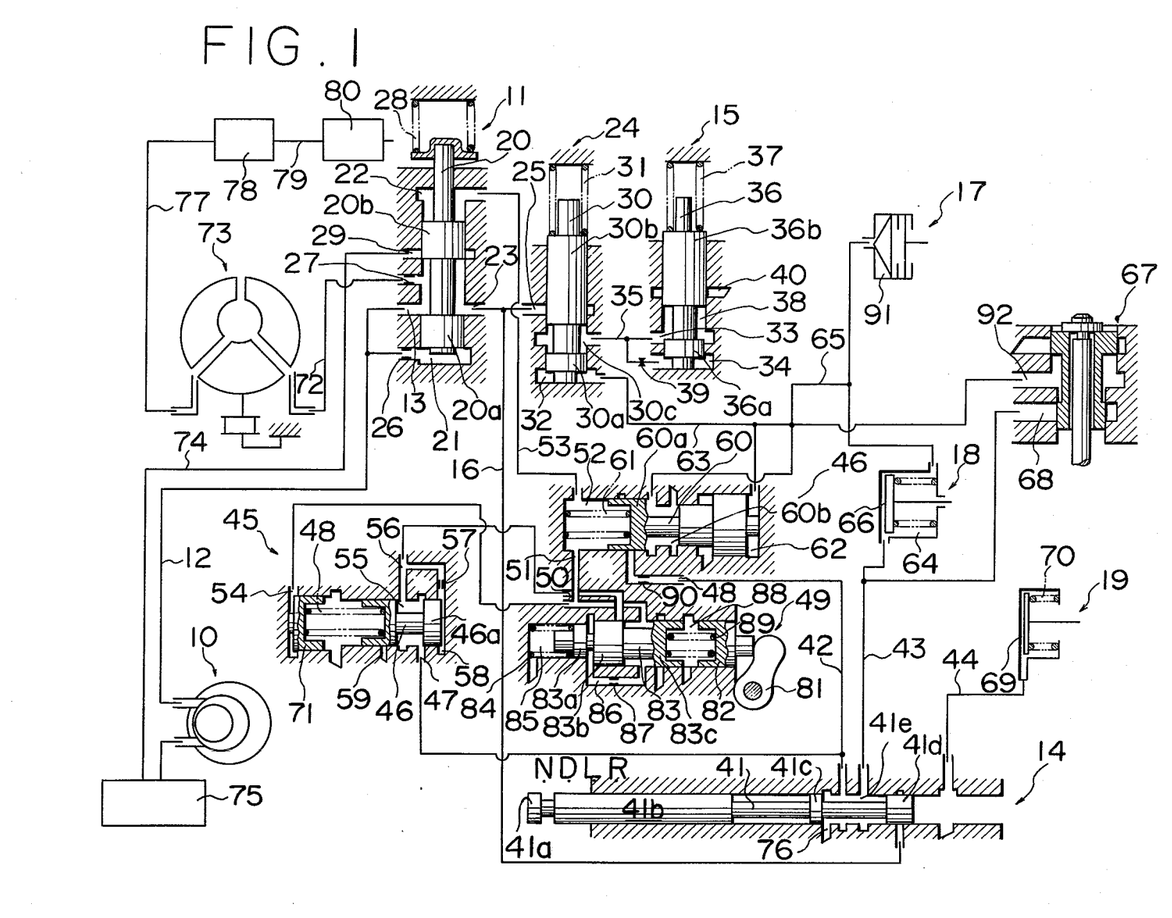
FIG. 1 is a schematic view of a fluid pressure control system constructed according to the present invention and showing its cooperative parts.

Referring now to the drawings, and more particularly to FIG. 1 thereof, an oil pump 10 is driven by means of the vehicle engine, not shown, and the oil pumped thereby is transmitted into the oil pressure control circuit. A first regulator valve, generally indicated by the reference character 11, includes a port 13 into which the pressurized oil from the pump 10 is transmitted through means of conduit 12 and such fluid is regulated at a predetermined high pressure value. A manual shift valve, generally indicated by the reference character 14 is fluidically connected with regulator valve 11 through means of port 23 thereof and a conduit 16 which thereby supplies the regulated high line pressure, from the first regulator valve 11, and the regulated low line pressure, one of such line pressures being selectively applied to a clutch 17 or brakes 18 and 19 by means of fluid conduits 43 and 44, whereby the transmission, not shown, is able to attain the different drive ratios as a result of the selective actuation of either the clutch 17 or one of the brakes 18 and 19.

The first regulator valve 11 includes a valve spool 20 having two lands 20a and 20b disposed thereon and fluid chambers 21 and 22 associated therewith at opposite ends thereof for applying fluid pressure to the lands 20a and 20b. The port 23 of the first regulator valve 11 is fluidically connected to a port 25 of another regulator valve, generally indicated by the reference character 24 through means of a branch conduit connected with the conduit 16. An orifice 26 is provided in conjunction with chamber 21 and is fluidically connected with conduit 12, the orifice serving to absorb any pulses characteristic of the pressurized fluid supplied to the chamber 21 so as to thereby prevent the valve spool 20 from vibrating. Another orifice 27 similarly associated with valve 20 serves to regulate the flow quantity of the lubricating oil to a torque converter 73 through means of a conduit 72. When the oil pressure within the chamber 21 is applied to the land 20a of valve spool 20 the opening and closing operation of a discharging port 29 of valve 11 is controlled by means of the land 20b of the valve spool 20 against the biasing force of a spring 28, which is associated with the end of spool 20 opposite that end upon which is disposed land 20a, and a throttle pressure transmitted into the chamber 22 and the resulting force applied to the land 20b of the valve spool 20, and consequently the high line pressure, which varies in accordance with the variation in the throttle pressure, is supplied to the conduit 16.

The regulator valve 24 similarly includes a valve spool 30, having two lands 30a and 30b of the same diameter, and a spring 31 associated with the end of spool 30 opposite that end upon which is disposed land 30a which normally biases the spool 30 in the downward direction as seen in FIG. 1. The regulator valve 24 is normally in the state shown in FIG. 1 as a result of the biasing force of spring 31, and when the valve is in this state, the port 25 connected to conduit 16 is closed by means of the land 30b. When the governor pressure supplied into the lower chamber 32 of valve 24 through means of a conduit 63 is greater than a predetermined value such as to overcome biasing force of the spring 31, the valve spool 30 will be displaced in the upward direction as seen in FIG. 1 whereby the port 25 will be connected, through means of another chamber 30c defined between lands 30a and 30b, to a conduit 35 which in turn is connected to a port 33 and a chamber 34 of still another regulator valve, generally indicated by the reference character 15. The latter valve is provided with a valve spool 36 which includes two lands 36a and 36b of the same diameter, and a spring 37 for biasing the valve 36 in the downward direction as seen in FIG. 1.

The oil pressure transmitted from the port 33 to a chamber 38, defined between lands 36a and 36b, controls the displacement of spool 36 and the opening and closing of a drain port 40 through means of land 36b at a pressure substantially equal to the oil pressure supplied to the chamber 34 through means of an orifice 39, which serves to prevent the vibration of valve spool 36 and such oil pressure is regulated as the lower line pressure, rather than the high line pressure regulated by means of the first regulator valve 11. This low line pressure is applied to the manual shift valve 14 through means of the conduit 35, the chamber 30c of the regulator valve 24, and the conduit 16. At this time, the line pressure within the conduit 16 becomes low line pressure so that the valve spool 20 of the first regulator valve 11 is moved in the downward direction as a result of the biasing force of the spring 28 and the first regulator valve 11 is disposed in a non-actuating state.

When the manual shift valve 14 is positioned to the neutral position designated N, the end of conduit 16 associated with valve 14 is closed by means of a land 41d disposed upon valve spool 41 and the conduits 42, 43, and 44 are connected with a discharge or drain port 76 of valve 14 whereby the brakes 18 and 19 are in a released state, the neutral state thus being presented. When the manual shift valve 14 is shifted to the drive position designated D, the conduit 16 is fluidically connected to the conduits 42 and 43 through means of a chamber 41e defined between a land 41c and the land 41d of spool 41, and when the manual shift valve 14 is shifted further to the low position designated L, the conduit 16 is connected solely to conduit 43. Similarly, when the manual shift valve 14 is displaced to the reverse position designated R, conduit 16 is fluidically connected with conduit 44 only.

Conduit 42 is fluidically connected to ports 47 and 48 of a reducing valve, generally indicated by the reference character 45, and a shift valve, generally indicated by the reference character 46, respectively. The regulated pressure of the reducing valve 45 is in turn transmitted to a port 50 of a throttle valve generally indicated by the reference character 49, which regulates the throttle pressure in accordance with the degree to which the engine throttle valve not shown, is opened, and the pressure regulated by means of the throttle valve 49 is then supplied to a chamber 52 of the shift valve 46 through means of a conduit 51 as well as to the chamber 22 of the first regulator valve 11 through means of a conduit 53. In this manner, the high line pressure regulated by means of the first regulator valve 11 is varied in accordance with the degree to which the engine throttle valve, not shown, is opened. The conduit 51 is also connected to another chamber 54 provided within the reducing valve 45 and the pressure regulated by means of the reducing valve 45 is thus varied in accordance with the throttle pressure value.

The reducing valve 45 also includes a valve spool 46 having a land 46a disposed upon the right end portion thereof as seen in FIG. 1, a plug 71 movably disposed within the left end portion of the valve as seen in FIG. 1, and a spring 48 interposed between valve spool 46 and plug 71 for biasing such components apart from each other. When the throttle pressure regulated by means of the throttle valve 49 is supplied to chamber 54 of reducing valve 45, plug 71 will be moved toward the right as seen in FIG. 1 and valve 46 is similarly moved toward the right through means of the spring 48. The line pressure supplied from conduit 42 to another chamber 55, via port 47, of the reducing valve 45 is also supplied in still another chamber 58 defined within the extreme right end portion, as seen in FIG. 1, of the valve 45 through means of an orifice 57 provided within a conduit 56 which serves to connect chambers 55 and 58, and consequently the valve spool 46 will be moved toward the left as seen in FIG. 1 against the biasing force of the spring 48 whereupon the communication between the conduit 42 and the chamber 55 will be terminated by means of the land 46a of spool 46. A drain port 59 is simultaneously opened whereby the oil pressure within the conduit 56 and the chamber 58 is decreased and the reducing valve 45 regulates the line pressure in accordance with the throttle pressure within chamber 54 and the setting load of spring 48, such regulated pressure being supplied to conduit 56 which of course is connected to the port 50 of the throttle valve 49. It is thus readily appreciated that when the regulated pressure within chamber 58 and conduit 56 is increased, fluidic communication with conduit 42 is interrupted by means of the land 46a of valve spool 46 whereupon such pressurized fluid will not be supplied to conduit 42, and conversely, when the regulated pressure within chamber 58 and conduit 56 is decreased, the conduit 42 is in fluidic communication with the conduit 56, through means of the chamber 55, and this would be true even if drain port 59 within reducing valve 45 were to be omitted.

Still referring to FIG. 1, a spring 61 is similarly disposed within the chamber 52 of the shift valve 46 for biasing a valve spool 60 toward the right as seen in FIG. 1, which movement corresponds to the low speed operation, and a chamber 62, supplied with the governor pressure through means of a conduit 63, is defined within the extreme right end portion of valve 46 whereby the governor pressure may counteract the forces of the spring 61 and the throttle pressure within chamber 52. Consequently, when the governor pressure within chamber 62 is low and the forces of the throttle pressure within chamber 52 and the spring 61 are large, and the valve spool 60 is within the state shown in FIG. 1, the port 48 of the shift valve 46 which is fluidically connected with the conduit 42 is closed by means of a land 60a of the valve spool 60, and conversely, when the governor pressure is increased such that the force of such pressure becomes larger than the forces of the throttle pressure and the spring 61, the conduit 42 will be fluidically connected to a conduit 65, which leads to an engaging chamber 91 defined within the clutch 17 and a disengaging chamber 64 defined within the first brake 18, through means of a chamber 60b defined within valve 46. The conduit 43 is likewise connected to an engaging chamber 66 of the first brake 18 and a port 68 of a governor valve 67, and the conduit 44 is connected to an engaging chamber 69 of the second brake 19, a spring 70 being disposed within brake assembly 19 for biasing the same to a non-actuated position.

The throttle valve 49 includes a plug 82 movably disposed within the right end portion thereof, a valve spool 83 having a plurality of lands 83a, 83b and 83c, and a spring 89, disposed within a chamber 88 which is interposed between plug 82 and valve spool 83, for urging the valve spool 83 toward the left as seen in FIG. 1. A chamber 85 is defined within the left end portion of valve 49 and has a spring 84 disposed therewithin, and an orifice 87 is provided within a conduit 86 associated with the valve, while a throttle arm 81 is in abutment with plug 82.

The port 29 of the first regulator valve 11 is connected to a fluid reservoir 75 through means of a conduit 74, and an oil cooler 78 is adapted to cool the pressurized oil passing through the torque convertor 73 through means of a conduit 77, suitable lubrication means 80 being connected to the oil cooler 78 through means of a conduit 79 for lubricating the gear trains, frictional sliding means, not shown, or the like associated with the transmission.

The operation of the embodiment disclosed within FIG. 1 will now be described hereinbelow in detail. The neutral state is shown in FIG. 1 and the high line pressure regulated by means of the first regulator valve 11 is supplied from port 23 of valve 11 to conduit 16, however, such high line pressure within conduit 16 is blocked by means of the land 41d of valve spool 41 of the manual shift valve 14 as well as by land 30b of valve spool 30 of the regulator valve 24, and consequently, such high line pressure is not able to be transmitted to conduits 42, 43, and 44. Accordingly, the clutch 17 and the brakes 18 and 19 are not able to be engaged.

When the governor valve 67 is actuated and the manual shift valve 14 is displaced from the above state to the drive or D position, the line pressure within the conduit 16 is now able to be transmitted to the conduits 42 and 43 through means of the valve chamber 41e within valve 14. The first brake 18 is thus able to be engaged as a result of the line pressure being transmitted through the conduit 43, which at this time, such line pressure within conduit 43 is a high line pressure as regulated by means of the first regulator valve 11, and this line pressure is additionally supplied to port 48 of the shift valve 46 through means of conduit 42. At the same time, it must also be noted that the line pressure within valve 45 is greater than the biasing force of spring 48 of the reducing valve 45 and the throttle pressure supplied to chamber 54 and the resulting pressure is supplied to port 50 of the throttle valve 49 and is regulated as a throttle pressure in accordance with the leftward movement of the plug 82 as a result of the movement of the throttle arm 81.

Thereafter, the line pressure, now regulated as a throttle pressure, is transmitted to chamber 52 of the shift valve 46 through means of conduit 51 and to chamber 22 of the first regulator valve 11 through means of conduit 53. The throttle pressure thus transmitted to chamber 22 serves to further regulate the high line pressure regulated by means of the first regulator valve 11 to an increased value in accordance with the degree to which the engine throttle valve, not shown, is opened. The throttle pressure supplied to chamber 52 of the shift valve 46 serves to move the valve spool 60 of the shift valve 46 toward the right against the governor pressure characteristic of the chamber 62 as supplied from the engaging chamber 92 of the governor valve 67 through means of the conduit 63. Fluidic communication from conduit 42 connected to port 48 of valve 46 is thus terminated by means of the land 60a of the valve spool 60 until the governor pressure is increased to a pressure sufficient to overcome the throttle pressure within chamber 52. Consequently, when the manual shift valve 14 is in the drive or D position and the vehicle speed is low whereby the governor pressure is not sufficiently high, low speed forward movement is obtained. At this time, the input pressure supplied from port 56 of the reducing valve 45 to the throttle valve 49 is regulated at a value slightly greater than the throttle pressure at that time as a result of the action of reducing valve 45, and even when the difference in pressure between the line pressure and the throttle pressure is greater than that noted above, the input pressure heretofore noted is not influenced by such high line pressure and the throttle pressure is not insignificant.

Continuing, further, when the vehicle speed is increased while the manual shift valve 14 is still within the drive or D position, the governor pressure supplied to chamber 62 of the shift valve 46 will naturally be increased so as to move the valve spool 60 toward the left as a result of overcoming the throttle pressure within chamber 52 and the biasing force of spring 61. The line pressure within conduit 42 is thus able to engage the clutch 17 as a result of transmission through chamber 60b of shift valve 46 and the conduit 65, and simultaneously therewith, the first brake 18 is released whereupon high speed forward movement is accomplished. At this time, the reducing valve 45 regulates the pressure supplied to valve 49 to a value greater than the required throttle pressure by a predetermined amount, and when the governor pressure is increased over a predetermined value, the governor pressure transmitted to chamber 32 of the regulator valve 24 is sufficient to move the valve spool 30 in an upward direction thereby over coming the downward biasing force of spring 31. As a result of such movement, previously blocked conduit 16 is now fluidically connected to conduit 35 through means of the chamber 30c of regulator valve 24, and consequently, the first regulator valve 11 is in the non actuation phase as aforementioned and the second regulator valve 15 is actuated whereby the low line pressure regulated by means of the second regulator valve 15 is supplied to conduit 16 whereby engaging pressure for clutch 17 is thus low line pressure.

The pressurized fluid supplied to the throttle valve 49 is regulated to a value lower than the line pressure and higher than the required throttle pressure, by a predetermined amount, by means of the reducing valve 45 and in no instance is the throttle pressure influenced by means of the high line pressure so as to exhibit an unanticipated value.

Figure 2:
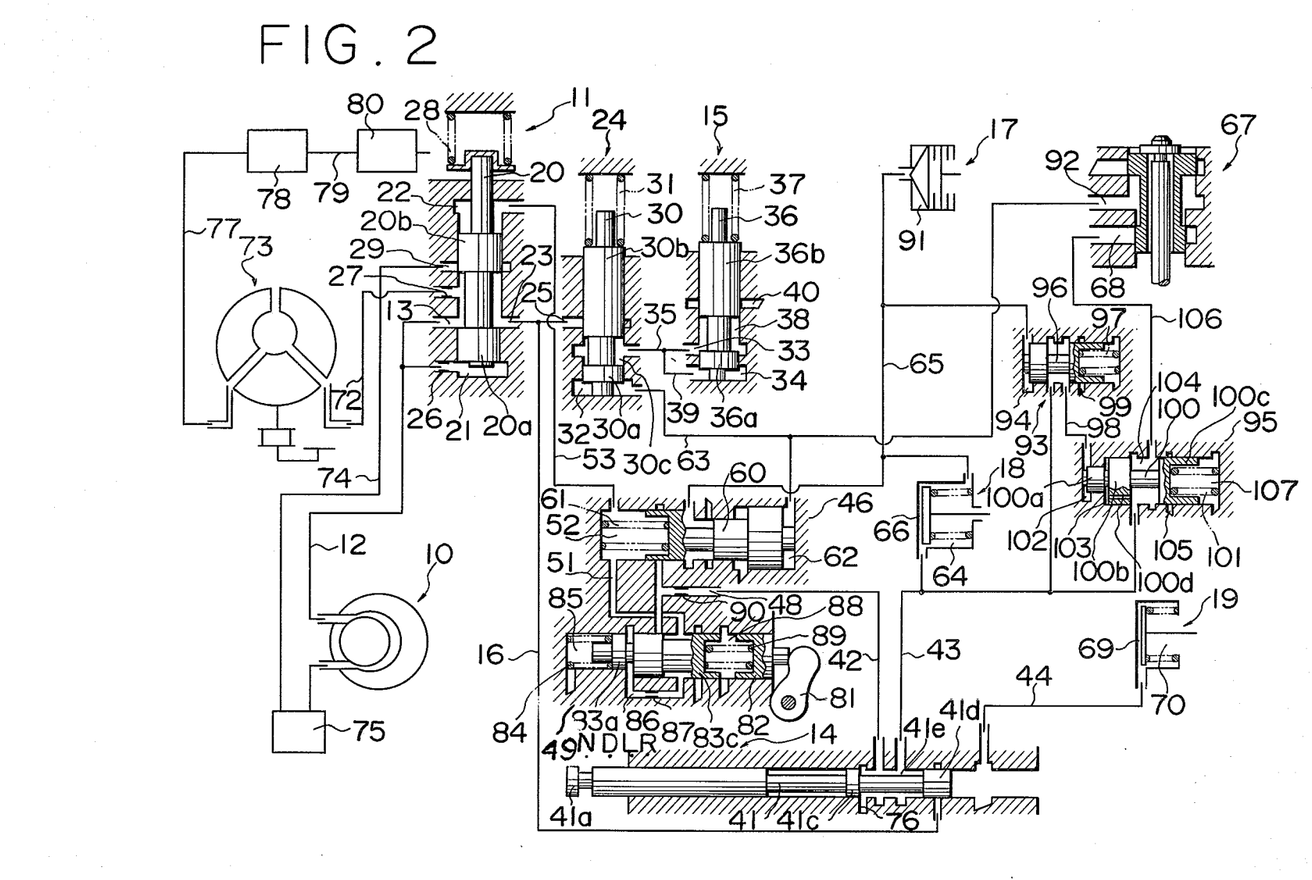
FIG. 2 is a view similar to FIG. 1, showing another embodiment of the present invention.

Referring now to FIG. 2, another embodiment of the present invention, having a different construction from that of FIG. 1, will now be described hereinbelow in detail. Within this embodiment, conduit 65 is connected to a signal chamber 94 of a changeover valve, generally indicated by the reference character 93, and conduit 43 is connected to engaging chamber 66 of the first brake 18 as well as to the changeover valve 93 and a chamber 104 of a modulator valve 95. The changeover valve 93 is seen to include a valve spool 96 and a spring 97 for biasing spool 96 toward the left as seen in FIG. 2, and the valve serves to fluidically connect conduit 43 to another conduit 98 leading to modulator valve 95 until the line pressure transmitted into the signal chamber 94 of the changeover valve 93 through means of the conduit 65 reaches a predetermined pressure, that is, the line pressure attains a pressure value capable of moving the valve spool 96 of changeover valve 93 toward the right thereby overcoming the biasing force of spring 97. When such actuation occurs, communication between the conduits 43 and 98 is interrupted by means of a land, not numbered, of spool 96, and conduit 98 is then fluidically connected to a drain port 99.

The modulator valve 95 is similarly seen to include a valve spool 100 which is provided with a plurality of lands 100a and 100b having different surface areas from each other and another land 100c the diametrical extent of which is the same as that of land 100b, a spring 101 being disposed within the right end portion of valve 95 for urging the valve spool 100 toward the left as seen in the FIGURE. Modulator valve 95 further includes a chamber 102 defined between land 100a and the left end wall of the valve for supplying the line pressure to land 100a from conduit 98 and changeover valve 93, and additional chambers 103 and 104 interposed between lands 100a and 100b, and between lands 100b and 100c, respectively, for similarly supplying the line pressure within conduit 43 to the differential surface areas of lands 100a and 100b, chambers 103 and 104 being suitably interconnected by means of a bore 100d which extends through land 100b, a drain port 105 also being associated therewith. The pressurized fluid transmitted from conduit 43 into chambers 104 and 103 through means of orifice or bore 100d acts upon the differential pressure areas of lands 100a and 100b and somewhat compresses spring 101 whereby valve spool 100 is moved slightly toward the right as seen in FIG. 2 and the opening and closing operation of the drain port 105 is controlled and regulated at an almost certain pressure which is supplied to port 68 of governor valve 67 through means of a conduit 106. When the line pressure is, however, transmitted into chamber 102 via changeover valve 93 and conduit 98, this regulated pressure is low pressure and when the line pressure is not transmitted into chamber 102, the regulated pressure is high pressure. The conduit 44 is of course connected to the engaging chamber 69 of the second brake 19.

The operation of FIG. 2 will now be described hereinbelow in detail. When the manual shift valve 14 is shifted from the neutral position N to the drive position-D, the line pressure within conduit 16 is transmitted to the conduits 42 and 43 through means of the chamber 41e of the manual shift valve 14. The first brake 18 is thus engaged by the line pressure transmitted by means of conduit 43, the line pressure at such time being high line pressure regulated by means of the first regulator valve 11, and this line pressure is further transmitted to chamber 102 of the modulator valve 95 through means of the changeover valve 93 and the conduit 98, the modulator pressure thus regulated as a low pressure by means of the line pressure transmitted to chamber 102 of the modulator valve 95 then being supplied to port 68 of the governor valve 67 by means of conduit 106. At this time, the high line pressure transmitted to the conduit 42 through means of the chamber 41e of the manual displacement valve 14 is in turn transmitted through port 48 and orifice 90 as well as throttle valve 49. The high line pressure transmitted through orifice 90 is regulated as the throttle pressure in accordance with the leftward movement of plug 82 as a result of the actuation of throttle arm 81 of the throttle valve 49 and is thereafter transmitted to chamber 52 of shift valve 46, through means of conduit 51, as well as to chamber 22 of the first regulator valve 11 through means of conduit 51, chamber 51 of shift valve 46, and conduit 53.

Furthermore, the high line pressure regulated by means of the first regulator valve 11 is thus regulated to an increased pressure value in accordance with the degree to which the engine throttle valve, not shown, is opened, at the same time the throttle pressure is provided to chamber 22 of the first regulator vlave 11 through means of the conduit 53. In addition, valve spool 60 of shift valve 46 is moved toward the right, against the governor pressure within chamber 62 which is transmitted from port 92 of governor valve 67 and through means of conduit 63, by means of the throttle pressure transmitted to chamber 52 of the valve 46 through conduit 51 as well as the biasing force of spring 61. As a result, conduit 42 is blocked by means of valve spool 60 until the governor pressure is increased to a pressure value which is sufficient to overcome the throttle pressure within chamber 52 and the force of spring 61 whereby communication between conduits 42 and 65 may be established. Accordingly, when the manual shift valve 14 is within the drive position D and the vehicle speed is low whereby the governor pressure is not increased to a sufficient pressure value, only low speed forward movement of the vehicle is attained and the input pressure supplied to port 68 of governor valve 67, through means of conduit 106, is regulated at a value slightly higher than the low governor pressure by means of the actuation of changeover valve 93 and modulator valve 95. Thus the governor pressure is not insignificant as a result of the influence of the high line pressure even when the difference in pressure between the line pressure and the governor pressure is excessively large.

Continuing further, when the vehicle speed is increased, the manual shift valve 14 remaining within the drive position D, the governor pressure within the chamber 62 of shift valve 46 will be sufficient to move the valve spool 60 toward the left and overcome the throttle pressure within the chamber 52 and the biasing force of spring 61. As a result, clutch 17 is able to be fully engaged by means of the line pressure within conduit 42 being transmitted through conduit 65, and the first brake 18 is similarly released as a result of the line pressure from conduit 42 being supplied to the releasing chamber 64 of the first brake 18, high speed forward movement of the vehicle now being accomplished. In addition, at this time, the fluid pressure within conduit 65, that is, the line pressure, is also supplied to the signal chamber 94 of changeover valve 93 and the valve spool 96 of changeover valve 93 is moved toward the right whereupon communication between conduits 43 and 98 is interrupted while communication between conduit 98 and drain port 99 is established.

Accordingly, the pressurized fluid within chamber 102 of modulator valve 95 is exhausted through means of conduit 98 whereby only the hydraulic fluid within chamber 103 opposes the force of spring 101. As a result, the pressurized fluid within chambers 103 and 104 becomes greater than when the line pressure remains within chamber 102, and this high pressure is then connected to port 68 of governor valve 67. At such time, the vehicle speed is high and the governor pressure becomes high as a result of the modulator pressure being increased which, as already noted, continuously and effectively increases the governor pressure. When the governor pressure becomes greater than a predetermined value, valve 30 of the regulator valve 24 is moved in an upward direction by means of the governor pressure within chamber 32 of the regulator valve 24 as transmitted through conduit 63, such pressure overcoming the downward biasing force of spring 31. Conduit 16, which had been previously blocked by land 30b of valve 30, is now able to be connected to conduit 35 through means of chamber 30c whereupon the first regulator valve 11 is disposed within the non-actuation state and the second regulator valve 15 becomes actuated. Therefore, the low line pressure regulated by means of the second regulator valve 15 is able to be supplied to the conduit 16 and serves as the engaging pressure for the clutch 17.

During the time of the low speed, forward movement of the vehicle, the vehicle speed is low and the pressure is less than the high line pressure and is modulated at a pressure greater than the governor pressure characteristic of the low speed, such pressure being supplied to port 68 of the governor valve 67. During the time of the high speed, forward movement of the vehicle the vehicle speed becomes high whereby the governor pressure is increased, and the modulated pressure as is necessary and sufficient in order to generate the high governor pressure, is applied to the governor valve 67, and therefore, the governor pressure regulated by means of the governor valve 67 becomes stable in accordance with the vehicle speed. It is thus readily understood that in order to change such governor pressure, the governor pressure may be supplied to the signal chamber 94 of the changeover valve 93 as a signal pressure and when the governor pressure within the signal chamber 94 reaches a predetermined value, that is, a pressure greater than the biasing force of spring 97, the regulated pressure of modulator valve 95 supplying such oil pressure to the governor valve 67, will be increased.

Figure 3:
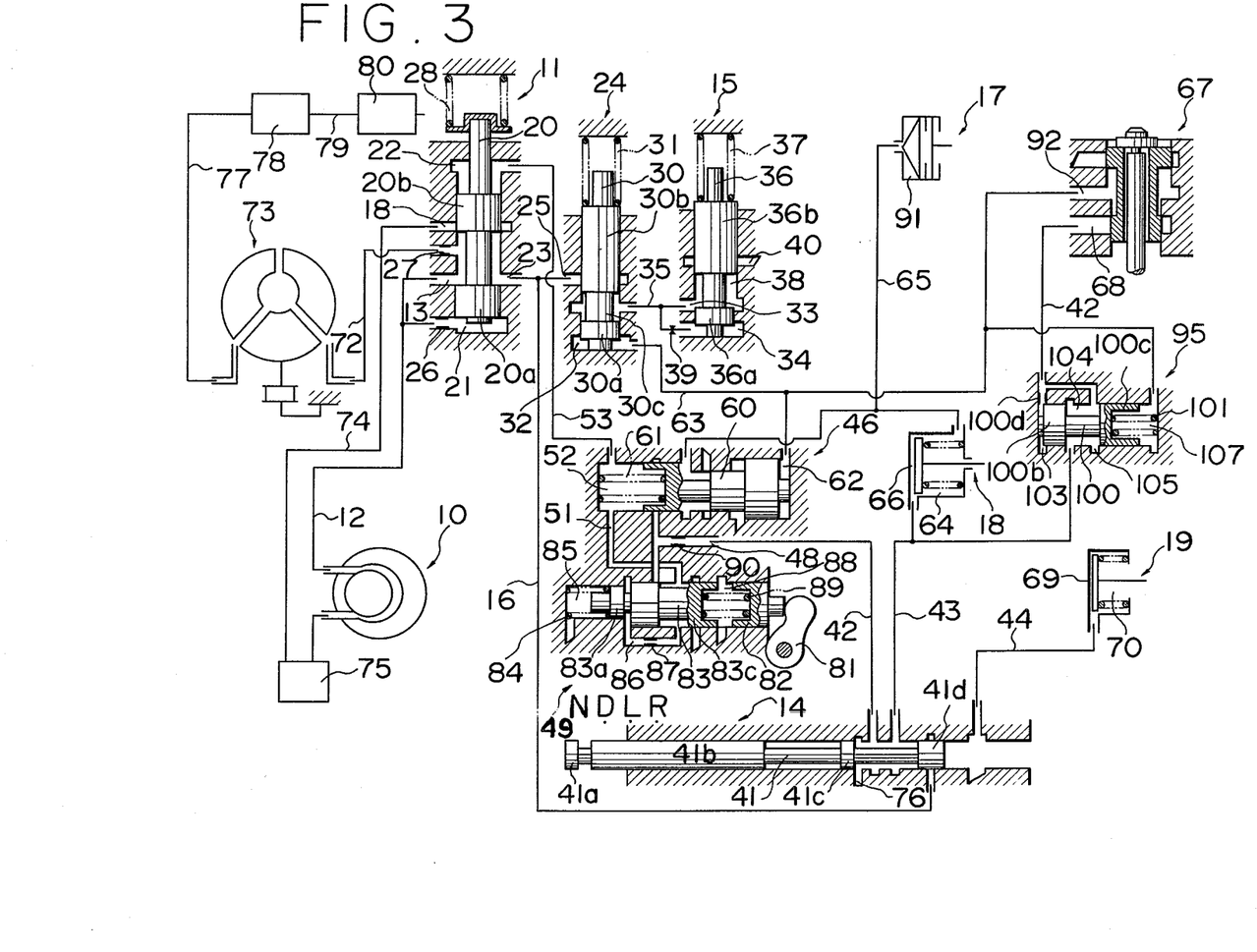
FIG. 3 is a view similar to FIG. 1, showing however still another embodiment of the present invention.

Referring now to FIG. 3, a further embodiment of the present invention is disclosed as having a construction different from that of the embodiment of FIG. 2, wherein more particularly, the modulator valve 95 and the signal pressure associated therewith will be described hereinbelow in detail. The pressurized fluid transmitted from conduit 43 to chamber 104 of modulator valve 95 is also supplied to chamber 103 through means of the orifice 100d and the valve spool 100 is moved toward the right against the biasing force of spring 101 as a result of the pressure being applied to the surface area of the land 100b of valve spool 100. When the valve spool 100 of modulator valve 95 is so moved, communication between conduit 43 and chamber 104 is interrupted by means of land 100b and chamber 104 is fluidically connected with drain port 105 whereupon the pressure within chambers 103 and 104 is decreased. Therefore, the pressure within the chambers 103 and 104 becomes responsive to the biasing force of spring 101 and the chamber 107 within which the spring 101 is disposed is connected to conduit 63 for supplying the governor pressure transmitted from governor valve 67, whereby the pressure within chambers 103 and 104 is increased or decreased in accordance with the variation in the governor pressure. In other words, the regulating pressure of the modulator valve 95 becomes greater than the governor pressure by an amount equal to the oil pressure for opposing the biasing force of spring 101, and the supply pressure to governor valve 67 becomes greater than the governor pressure by a predetermined value.

Figure 4:
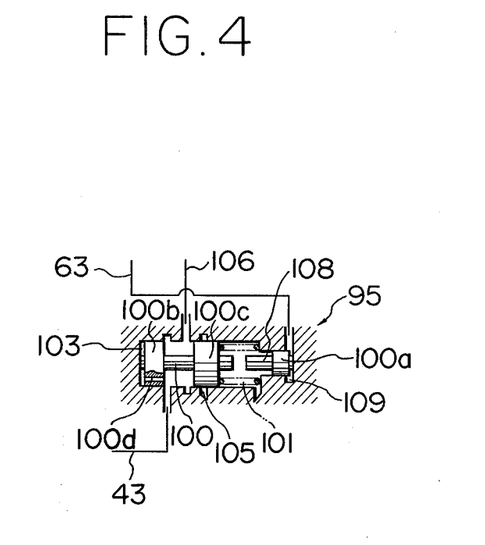
FIG. 4 is a schematic view of another embodiment of a modulator valve which may be utilized within the system of FIG. 2.

Turning now to FIG. 4 wherein there is shown another embodiment of the modulator valve 95, the signal chamber 109 is disposed away from the valve spool 100 and the diameter of valve plug 108 which includes the land 100a is different from that of the valve spool 100. The valve plug 108 is moved toward the left by means of the signal pressure supplied to the signal chamber 109 through means of the conduit 63 as seen in FIG. 4, and the pressure regulated by modulator valve 95 is therefore varied. The remaining construction and operation of the valve 95 shown in FIG. 4 is similar to the valve 95 shown in FIG. 3, and consequently, a description of the same is omitted herefrom. It may also be noted that it is possible to construct the valve 95 such that the right end portion of spring 101 is received within a portion of the plug 108 and the spring force is varied by compressing the spring 101 in response to the values of the signal pressure within chamber 109 applied to the plug 108.

Obviously, many modifications and variations of the present invention are possible in light of the above teachings. It is to be understood therefore, that within the scope of the appended claims, the present invention may be practiced otherwise than as specifically described herein.

What is claimed as new and desired to be secured by Letters Patent of the United States is:

1. A fluid pressure control system for automatic fluid transmissions, comprising:
   a fluid pressure source;
   a fluid pressure regulating valve for regulating the hydraulic fluid from said fluid pressure source to a particular line pressure;
   a plurality of frictional engaging means actuated by said line pressure from said fluid pressure regulating valve for attaining a particular gear ratio within the gear trains of said transmission interposed between an input shaft and an output shaft;
   a governor valve for generating a governor pressure which is increased or decreased in response to the rotational speed of said input shaft;
   a manual shift valve operatively connected to said fluid pressure regulating valve for supplying said line pressure to said plurality of frictional engaging means;
   a throttle valve fluidically connected to said manual shift valve for generating a throttle pressure responsive to an engine throttle valve;
   a shift valve actuated in response to said governor pressure and said throttle pressure for automatically selectively actuating said plurality of frictional engaging means; and
   a reducing valve interposed between said throttle valve and said manual shift valve for regulating said line pressure to said throttle valve to a value slightly greater than said throttle pressure and lower than said line pressure as said throttle pressure is varied by means of said throttle valve.

2. A fluid pressure control system for automatic fluid transmissions as set forth in claim 1 which further comprises:
   chamber means provided within said reducing valve and supplied with said throttle pressure from said throttle valve for generating a regulating pressure which is normally greater than said throttle pressure.

3. A fluid pressure control system for automatic fluid transmissions, comprising:
   a fluid pressure source;
   a fluid pressure regulating valve for regulating the hydraulic fluid from said fluid pressure source to a particular line pressure;
   a plurality of frictional engaging means actuated by said line pressure from said fluid pressure regulating valve for attaining a particular gear ratio within the gear trains of said transmission interposed between an input shaft and an output shaft;
   a governor valve for generating a governor pressure which is increased or decreased in response to the rotational speed of said input shaft;
   a manual shift valve operatively connected to said fluid pressure regulating valve for supplying said line pressure to said plurality of frictional engaging means;
   a throttle valve fluidically connected to said manual shift valve for generating a throttle pressure responsive to an engine throttle valve;
   a shift valve actuated in response to said governor pressure and said throttle pressure for automatically selectively actuating said plurality of frictional engaging means; and valve means interposed between said fluid pressure regulating valve and said governor valve for regulating said line pressure to said governor valve to a value slightly greater than said governor pressure and lower than said line pressure as said governor pressure is varied.

4. A fluid pressure control system for automatic fluid transmissions as set forth in claim 3 wherein said valve means comprises:

a pressure chamber supplied with said pressurized fluid being conducted between said fluid pressure regulating valve and said governor valve;

a valve spool disposed within said pressure chamber;

spring means for urging said valve spool in a direction opposite that which said pressurized fluid within said pressure chamber will bias said spool; and a drain port connected to said pressure chamber when said pressurized fluid within said pressure chamber overcomes the biasing force of said spring means, whereby said valve spool is moved in a direction so as to compress said spring means.

5. A fluid pressure control system for automatic fluid transmissions as set forth in claim 4 wherein: the biasing force of said spring means is of such a value that said pressure within said pressure chamber is less than said line pressure and greater than said governor pressure.

6. A fluid pressure control system for automatic fluid transmissions as set forth in claim 5 wherein said valve means further comprises:

first additional fluid chamber means for transmitting a biasing force to said valve spool in the same direction as said fluid pressure within said pressure chamber and for regulating the variable pressure within two speed steps in accordance with a signal pressure transmitted to said additional chamber means.

7. A fluid pressure control system for automatic fluid transmissions as set forth in claim 5 wherein said valve means further comprises:

second additional chamber means for transmitting a biasing force to said valve spool in a direction contra to that of said fluid pressure within said pressure chamber and being supplied with said governor pressure and for regulating the pressure to a value greater than said governor pressure as determined by the biasing force of said spring means.

* * * * *